(12) United States Patent
Wang et al.

(10) Patent No.: US 8,331,886 B2
(45) Date of Patent: Dec. 11, 2012

(54) DYNAMIC SCALABLE CONCURRENT COMMUNICATION AND MULTI-CORE RECEIVER ARCHITECTURE

(75) Inventors: Yu-Jiu Wang, Taichung (TW); Seyed Ali Hajimiri, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 403 days.

(21) Appl. No.: 12/564,454

(22) Filed: Sep. 22, 2009

(65) Prior Publication Data

US 2010/0075622 A1 Mar. 25, 2010

Related U.S. Application Data

(60) Provisional application No. 61/192,793, filed on Sep. 22, 2008.

(51) Int. Cl.
*H04B 1/04* (2006.01)
(52) U.S. Cl. ..... 455/132; 455/130; 455/133; 455/160.1; 455/333; 455/341
(58) Field of Classification Search ............ 455/130, 455/132, 133, 160.1, 178.1, 252.1, 260, 264, 455/303, 179.1, 333, 341
See application file for complete search history.

(56) References Cited

U.S. PATENT DOCUMENTS

| | | | |
|---|---|---|---|
| 6,226,507 B1 * | 5/2001 | Ramesh et al. | 455/277.1 |
| 8,107,916 B2 * | 1/2012 | Gatta et al. | 455/285 |
| 2007/0105517 A1 * | 5/2007 | Chang et al. | 455/249.1 |
| 2007/0207760 A1 * | 9/2007 | Kavadias et al. | 455/255 |

OTHER PUBLICATIONS

Yuanjin Zheng; King-Wah Wong; Annamalai Asaru, M.; Dan Shen; Wen Hu Zhao; Yen Ju The; Andrew, P.; Fujiang Lin; Wooi Gan Yeoh; Singh, R.; , "A 0.18 μm CMOS Dual-Band UWB Transceiver," Solid-State Circuits Conference, 2007, ISSCC 2007. Digest of Technical Papers. IEEE International, pp. 114-590, Feb. 11-15, 2007.
Lee, F.S.; Chandrakasan, A.P.; , "A 2.5nJ/b 0.65V 3-to-5GHz Sub-banded UWB Receiver in 90nm CMOS," Solid-State Circuits Conference, 2007, ISSCC 2007, Digest of Technical Papers. IEEE International, pp. 116-590, Feb. 11-15, 2007.
Yuanjin Zheng; Annamalai Arasu, M.; King-Wan Wong; Yen Ju The; Suan, A.P.H.; Duy Duong Tran; Wooi Gan Yeoh; Dim-Lee Kwong; , "A 0.18 μm CMOS 802.15.4a UWB Transceiver for Communication and Localization," Solid-State Circuits Conference, 2008, ISSCC 2008. Digest of Technical Papers. IEEE International, pp. 118-600, Feb. 3-7, 2008.

(Continued)

*Primary Examiner* — Tuan Pham
(74) *Attorney, Agent, or Firm* — Milstein Zhang & Wu LLC; Joseph B. Milstein

(57) ABSTRACT

An integrated multi-core RF device includes a common amplifier which outputs an amplified RF signal. A common transmission line is configured to supply the amplified RF signal to a plurality of common transmission line distribution connections. Each receiver core of a plurality of receiver cores has a receiver core RF input coupled to one of the plurality of common transmission line distribution connections. Each core is configured to be tunable to a channel and to output at least one baseband output per channel. The integrated multi-core RF device is configured to concurrently down convert a plurality of channels to corresponding down converted baseband signals. The integrated multi-core RF device is configured to allow dynamic selection of the one or more of the plurality of channels over time. A method to recover a DSCC receiver IC is also described.

14 Claims, 8 Drawing Sheets

OTHER PUBLICATIONS

Bergervoet, J.R.; Harish, K.S.; Lee, S.; Leenaerts, D.; Van De Beek, R.; Van Der Weide, G.; Roovers, R.; , "A WiMedia-Compliant UWB Transceiver in 65nm CMOS," Solid-State Circuits Conference, 2007. ISSCC 2007, Digest of Technical Papers. IEEE International, pp. 112-590, Feb. 11-15, 2007.

Werther, O.; Cavin, M.; Schneider, A.; Renninger, R.; Liang, B.; Bu, L.; Jin, Y.; Marcincavage, J.; , "A Fully Integrated 14-Band 3.1-to-10.6GHz 0.13 μm SiGe BiCMOS UWB RF Transceiver," Solid-State Circuits Conference, 2008, ISSCC 2008. Digest of Technical Papers. IEEE International, pp. 122-601, Feb. 3-7, 2008.

Yu-Jiu Wang; Hajimiri, A.; , "A compact low-noise weighted distributed amplifier in CMOS," Solid-State Circuits Conference—Digest of Technical Papers, 2009, ISSCC 2009. IEEE International, pp. 220-221,221a, Feb. 8-12, 2009.

* cited by examiner measured performance summary

| | | |
|---|---|---|
| Input return loss (3.1~10.6 GHz) | | >15dB[1] |
| Max. conv. gain | LB | 52~61dB |
| | MB | 52~65dB |
| | HB | 45~54dB |
| VGA range | | 40dB |
| Noise figure[2] | LB | 2.6~3.5dB |
| | MB | 3.4~5dB |
| | HB | 5~11dB |
| Input referred IP3 | | -21~-10dBm |
| Input referred 1dB compression | | -35~-20dBm |
| Cross-band rejection | | --- dBc |
| Receiver Shannon limit at 5 meters | | ~10 Gbps |
| Backward compatibility | | group1 MB-OFDM |
| Power consumption | sleep-mode | 1mA |
| | WDLNA and RF buffer | 28mA@1.3V |
| | RF balun and distribution | 20mA@1V |
| | typical unit core | ---@1V |
| | max. gain unit core | ---@1V |
| | total power with N core | 28mA@1.3V+ (X+Y*N)@1V |
| Technology | | 130nm CMOS 1P7M |
| Die area | | 1.3 x 2.7 mm$^2$ |

All measurement results are based on chip-on-board packaging with 1.0V supply; otherwise specified.

1. On-wafer measurement result.
2. measured at 1.4V supply

FIG. 5 chip micrograph

DYNAMIC SCALABLE CONCURRENT COMMUNICATION AND MULTI-CORE RECEIVER ARCHITECTURE

CROSS-REFERENCE TO RELATED APPLICATIONS

This application claims priority to and the benefit of U.S. provisional patent application DYNAMIC SCALABLE CONCURRENT COMMUNICATION AND MULTI-CORE RECEIVER ARCHITECTURE, Ser. No. 61/192,793, filed Sep. 22, 2008, which application is incorporated herein by reference in its entirety.

STATEMENT REGARDING FEDERALLY FUNDED RESEARCH OR DEVELOPMENT

The U.S. Government has certain rights in this invention pursuant to Grant No. N00014-04-C-0588 awarded by Office of Naval Research and Grant No. ECS0239343 awarded by the National Science Foundation.

FIELD OF THE INVENTION

The invention relates to concurrent radio communications in general and particularly to a multi-core receiver that employs concurrent communications.

BACKGROUND OF THE INVENTION

The 3.1~10.6 GHz band has received less attention than the unlicensed 7 GHz bandwidth, such as the 60 GHz-band as regards multi-gigabit wireless communication. One reason is that a conventional single carrier based analog modem is ineffective with the 3.1~10.6 GHz band's relatively wide baseband bandwidth over carrier frequency. In addition, the low equivalent isotropically radiated power (EIRP) limit enforced by the FCC would appear to render the band unsuitable for high performance applications.

Previous work in the 3.1~10.6 GHz band has been either impulse-based or compliant with WiMedia's MB-OFDM. An impulse-based method has a low spectral efficiency, and is susceptible to inter-symbol interference for high data-rate applications. The MB-OFDM compliant approach is a diversity improved narrow-band communication, which only utilizes 528 MHz of the 7.5 GHz RF spectrum at a given timeslot. The fast frequency hopping requirement of the standard also adds significant overhead for system implementation.

What is needed, therefore, is a more efficient receiver architecture for multi-gigabit wireless communication in the 3.1~10.6 GHz band.

SUMMARY OF THE INVENTION

According to one aspect, an integrated multi-core RF device includes a substrate having a surface. A common amplifier is disposed on the substrate. The common amplifier is electrically coupled to a RF input terminal and outputs an amplified RF signal. A common transmission line is electrically coupled to the common amplifier and configured to supply the amplified RF signal to a plurality of common transmission line distribution connections. A plurality of receiver cores is disposed on the substrate. Each receiver core of the plurality of receiver cores has a receiver core RF input that is electrically coupled to one of the plurality of common transmission line distribution connections. Each core is configured to be tunable to a channel and to output at least one baseband output per channel. The integrated multi-core RF device is configured to concurrently receive one or more of a plurality of channels using a set of active receiver cores that is configured to concurrently down convert the each one of the plurality of channels to a corresponding down converted baseband signal. The integrated multi-core RF device is configured to allow dynamic selection of the one or more of the plurality of channels over time.

In one embodiment, the common amplifier includes a weighted distributed low noise amplifier.

In another embodiment, the common transmission line includes a balanced transmission line.

In yet another embodiment, the integrated multi-core RF device further includes a RF balun electrically disposed between the common amplifier and the balanced transmission line.

In yet another embodiment, each of the receiver cores includes an I baseband output and a Q baseband output.

In yet another embodiment, each of the receiver cores includes a RF input amplifier (IA) having a RF IA output, a first mixer, a second mixer, an I&Q generator configured to provide a LO-I signal electrically coupled to a first input of the first mixer and a LO-Q signal electrically coupled to a first input of the second mixer, a second input terminal of the first mixer and the second mixer both electrically coupled to the RF IA output. The first mixer is configured to provide an I baseband output and electrically coupled to an I baseband output terminal and the second mixer configured to provide a Q baseband output and electrically coupled to a Q baseband output terminal.

In yet another embodiment, the LO-I and the LO-Q signals of each of the receiver cores are configured to have a LO frequency of f×n, where f is a fundamental frequency and where n is an odd integer in the range of 7 to 19 and at least each adjacent receiver core disposed on the substrate has a different the LO-I and the LO-Q signal frequency.

In yet another embodiment, the LO frequency is given by the equation: LOfreq=528*n MHz, where n is an odd integer in the range of 7 to 19.

In yet another embodiment, each of the receiver cores further includes a phase locked loop (PLL) electrically coupled to an input of the I&Q generator, the PLL electrically coupled to a frequency reference.

In yet another embodiment, the PLL of each of the receiver core includes a voltage-controlled oscillator (VCO) having a tuning range and wherein two or more receiver cores are configured to have overlapping tuning ranges.

In yet another embodiment, a selected number of the plurality of receiver cores are configured to be made active according to a selected one of availability of the receiver core and data rate demand.

In yet another embodiment, the integrated multi-core RF device is configured to be controlled to provide a maximum physical distance between receiver cores that are active in real time and that have adjacent LO frequencies.

In yet another embodiment, the integrated multi-core RF device further includes a guard ring substantially surrounding at least one of the receiver cores.

In yet another embodiment, a DSCC RF receiver includes an antenna and a DSCC IC as described above. The RF input terminal is electrically coupled to the antenna and configured to receive an electromagnetic signal. A demodulator demodulates the baseband output and provides a corresponding demodulated output signal at a receiver output terminal. An electronic circuit is configured to control the DSCC IC. A power source is configured to power the DSCC IC, the demodulator, and the electronic circuit.

In yet another embodiment, the electronic circuit includes a microprocessor.

According to another aspect, a method to recover a DSCC receiver IC includes the steps of: (a) providing a multi-core DSCC receiver IC having N cores, where N is an integer greater than 1; (b) performing a bias scan to measure a circuit deviation of each of the N cores; (c) adjusting at least one parameter of a selected one of common mode voltage and bias current of each of the N cores to achieve a selected one of minimal deviation and optimal bias current; and (d) saving the at least one parameter to memory; whereby each of the Rx cores is configured to operate according to a set of saved parameters including the at least one parameter saved to memory in step (d).

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 5 shows a table of performance measurements of the exemplary octa-core DSCC receiver described herein.

The drawings are not necessarily to scale, emphasis instead generally being placed upon illustrating the principles of the invention. In the drawings, like numerals are used to indicate like parts throughout the various views.

DETAILED DESCRIPTION

As described in the background section hereinabove, the EIRP limit enforced by the FCC would appear to render the 3.1~10.6 GHz band unsuitable for high performance applications. However, we believe that systems that operate with low EIRP can be implemented, especially since the 3.1~10.6 GHz RF signal has on average, 20 dB less channel path loss when compared to its 60 GHz counterpart. In addition, at the 3.1~10.6 GHz frequency range, RF signals can more easily penetrate through or diffract around obstacles along a wireless link, which makes non-line-of-sight communication possible.

Figure 1:
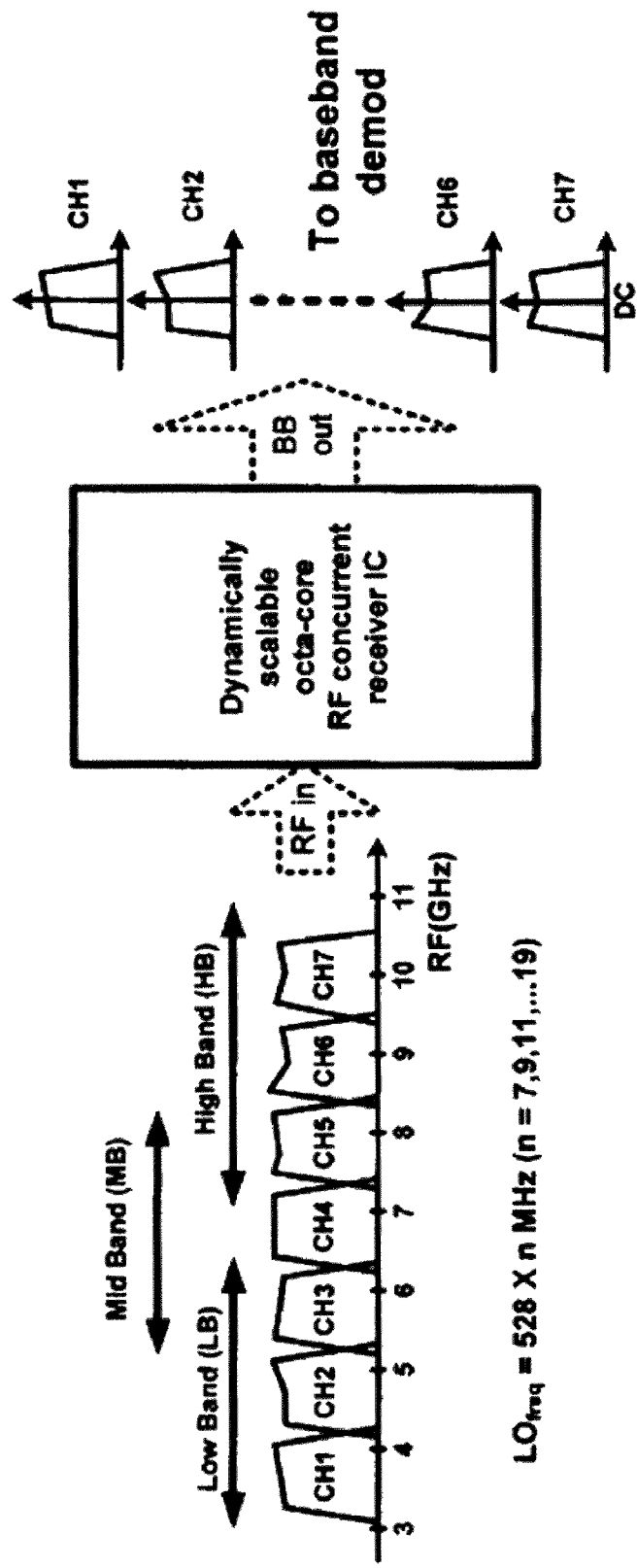
FIG. 1 shows a block diagram illustrating multi-channel concurrent channel down conversion to baseband using one exemplary embodiment of a dynamically scalable concurrent communication (DSSC) receiver integrated circuit (IC).

We describe herein an inventive receiver solution suitable for use in the 3.1~10.6 GHz frequency range, employing a dynamically scalable concurrent communication (DSCC) system and we provide a multi-core RF (radio frequency) architecture for such a system. We also describe hereinbelow an exemplary octa-core receiver implementation. In one embodiment as shown in FIG. 1, the DSCC receiver divides the 3.1~10.6 GHz unlicensed spectrum into seven channels, and dynamically allocate several of the seven channels depending on their availability and the data-rate demands. In other embodiments, any suitable number N of channels can be used. Since each of the concurrent channels has a reduced base-band bandwidth from the total 7.5 GHz unlicensed bandwidth, both the sampling rate and dynamic range requirement of the data conversion interfaces are reduced, thus further simplifying the baseband complexity and reducing the overall system power consumption. Our DSCC concurrently downconverts all "active" channels to baseband. Active channels are those channels selected for concurrent operation at any given time (typically based on their availability and data-rate demands). Any number of channels can be in concurrent (simultaneous) use at any time.

FIG. 1 shows a block diagram illustrating one exemplary system for multi-channel concurrent channel down conversion to baseband by one embodiment of a DSCC receiver in the form of a DSCC RF receiver IC. The DSCC octa-core receiver IC is configured for dynamically scalable concurrent communication over a frequency range of about 3.1 GHz to 10.6 GHz. As described above, any number of channels the available channels (seven channels in FIG. 1) can be used at any time. In FIG. 1, it can be seen that the RF channels, CH1 to CH7, are shown distributed in roughly equal bandwidth across the frequency range. In the exemplary implementation described herein, the local oscillator (LO) frequencies, which determine which channel each core is responsive to at any given time, can be configured according to the equation:

$$LO_{freq} = 528 \ast n \text{ MHz} \qquad \text{Eq. (1)}$$

where n is an odd integer in the range of 7 to 19. Selecting n in this manner assures that the values of n are relatively prime (e.g., prime as regards any other integer in the sequence, or not having a common multiplicative factor with regard to any other integer in the sequence).

The dynamically scalable RF concurrent receiver IC transforms the RF input channels to individual base band channels that can be made available at baseband output terminals as one baseband output per core. As indicated by the phrase "To Baseband demod" in FIG. 1, the baseband outputs are typically then further demodulated by successive receiver stages according to any suitable demodulation technique for the type or types of communication modulation in use. It is unimportant whether or not successive stages (e.g. baseband demodulation circuitry) are integrated on to a common substrate.

Several problems had to be overcome to achieve a working DSCC multi-core (N cores) receiver. In the worst-case in the exemplary seven channel DSCC receiver, with seven concurrent down-conversions in a single chip (i.e. all seven channels "active" at a given time), involves simultaneously generating seven LO frequencies on the (IC) chip. Interference between different down-conversion paths, such as when many of the cores are simultaneously active, can cause a DSCC receiver to fail to operate properly. Also, the total power consumption of the receiver needs to be reasonably low for a practical DSCC architecture.

Figure 2:
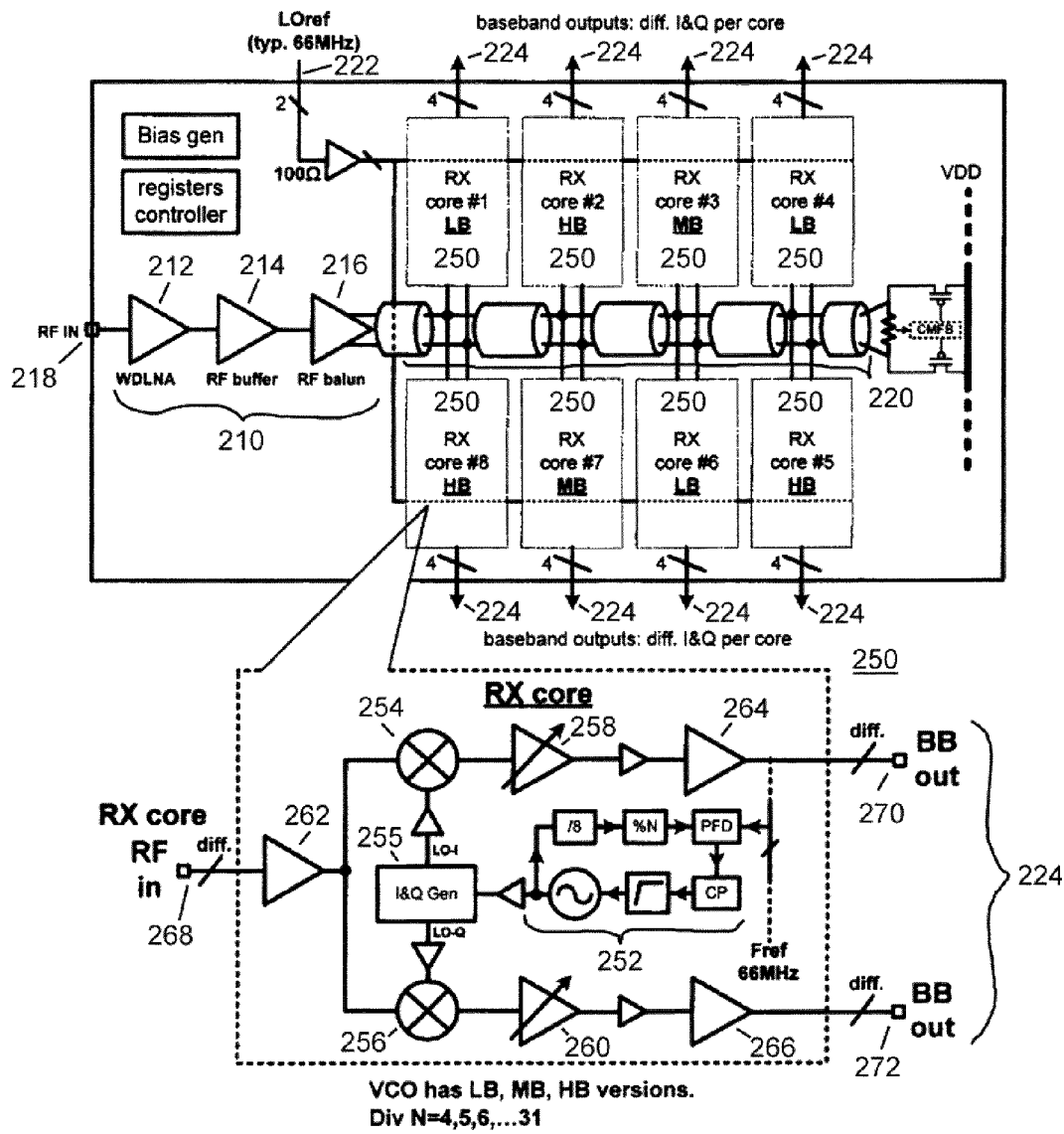
FIG. 2 shows block diagram illustrating one embodiment of a DSCC system architecture suitable for use in an octa-core (8 cores) radio frequency (RF) receiver.

FIG. 2 shows a block diagram illustrating one embodiment of the DSCC system architecture suitable for use in a DSCC receiver, in the form of an exemplary octa-core RF receiver. The octa-core RF receiver 200 addresses the two problems described hereinabove, multiple LO frequencies simultaneously generated on chip and overall power consumption.

While the exemplary receiver uses 8 cores, in other possible embodiments, any convenient number N of cores can be used. The DSCC system includes a main RF amplification section 210 and eight digital independently controlled down-conversion cores 250. The main RF amplification section 210 (common to all 8 cores) includes a weighted distributed low noise amplifier (WDLNA) 212 such as, for example, of the type described by Wang, et al. in "A compact weighted distributed low noise amplifier in CMOS," submitted to the 2009 IEEE International Solid-State Circuits Conference (ISSCC), a RF buffer 214, and a RF balun 216. RF amplification section 210 amplifies an input broadband RF signal at RF input terminal 218 to a signal level high enough to prevent noise degradation from each core 250. A resistor terminated transmission line 220 distributes RF signal to the inputs of each core 250. Frequency synthesis and RF signal down-conversion is accomplished inside of each core 250. Each core includes a complete integer-N phase locked loop (PLL) 252, I&Q generator 255, I&Q down-conversion mixers 254, 256, and baseband variable gain buffers 258, 260. In the exemplary embodiment, amplifier 262 buffers the RF signal from the transmission line 220 to an input of each of the I&Q (in-phase and quadrature) down-conversion mixers 254, 256. In the exemplary embodiment, amplifiers 264, 266 buffer the I&Q base band signals out to I baseband output terminal 270 and Q output baseband signal terminal 272 of base band outputs 224.

In some embodiments, due to the limited tuning range of the Inductive-Capacitive (LC) Voltage-Controlled-Oscillator (VCO) inside the PLLs, there can be three different VCO versions: low-band (LB), mid-band (MB) and high-band (HB). Thus in such embodiments, the eight cores can be categorized as three HB cores, two MB cores, and three LB cores. Exemplary frequency ranges for each band are shown in FIG. 1. This overlapping band arrangement tolerates VCO frequency drift, such as can be caused by process variation. Since the exemplary octa-core DSCC receiver has available eight cores configured to cover several channels, typically either one of the HB or LB cores is inactive at any given time when all of the other cores (seven of the eight) are concurrently working.

Thus, it can be seen that any core at any given time can be tuned to any channel to which the core is capable of being tuned. For example, in the exemplary DSCC receiver, there are eight cores which at any given moment of time can be dynamically "assigned" to any suitable desired channel that the core can cover. For example, as described hereinabove and as illustrated in FIG. 2, "LB" range cores 1, 4, and 6 can be dynamically tuned as desired to any of CH1, CH2, or CH3 at any given time; "MB" cores 3 and 7 can be can be dynamically tuned as desired to any of CH3, CH4, or CH5; and "HB" cores 2, 5, and 8 can be dynamically tuned as desired to any of CH5, CH6, or CH7. The overlap as described above where both "LB" and "MB" cores can tune CH3, and both "MB" and "HB" cores can tune CH5. The number of overlapping channels is unimportant and can vary in other embodiments. The different range cores can be physically placed on a substrate to minimize interaction between the components of each core, particularly to minimize interaction between the I&Q LO signals. In other embodiments, for example in embodiments of a DSCC receiver in which all cores can tune all channels, any core can be dynamically assigned to any desired channel. Thus, in some embodiments there can typically be more cores available for tuning than the designed maximum number of channels to be concurrently received at any given time. For example, the exemplary octa-core DSCC receiver has eight cores for a maximum of seven concurrent channels in the design presently discussed. In embodiments where it is desirable to be able to use all channels concurrently at any given time, there should be at least as many cores as channels. Beyond practical manufacturing considerations, there is no limit to the number of DSSC cores or designed maximum number of concurrent received channels.

Core-to-core interference has been minimized by frequency planning and the use of one or more of the following three DSCC integrated circuit design techniques. First, using LO frequencies calculated according to equation 1, we can ensure that there will be substantially no third-order spurious harmonic mixing from the lowest to the highest channel (e.g. CH1 to CH7 in the exemplary octa-core embodiment). In addition, there is substantially no frequency pulling or interlocking between the VCOs because there is no simple multiplier that relates the LO frequencies of the plurality of cores. Second, placement of the N cores (FIG. 2) and the dynamic allocation of which of the N cores are active in real time can be used to ensure a maximum physical distance between cores having adjacent LO frequencies. Third, wide guard rings with strong de-Q supply bypass can be provided to surround each core to reduce substrate coupling and supply/ground network perturbations.

Reduced system power consumption has been achieved at both the system and the circuit levels. The use of one PLL per core provides for a minimum routing distance of the high-frequency LO signals. Only the lower frequency system reference (typical 66 MHz) is routed across the chip. Inside of the PLL, other than the first two pre-scalers which are source coupled logic (SCL), all of the divider chain elements are true single phase clocking logic (TSPC) which reduces both the static and dynamic current consumption.

Figure 3A:
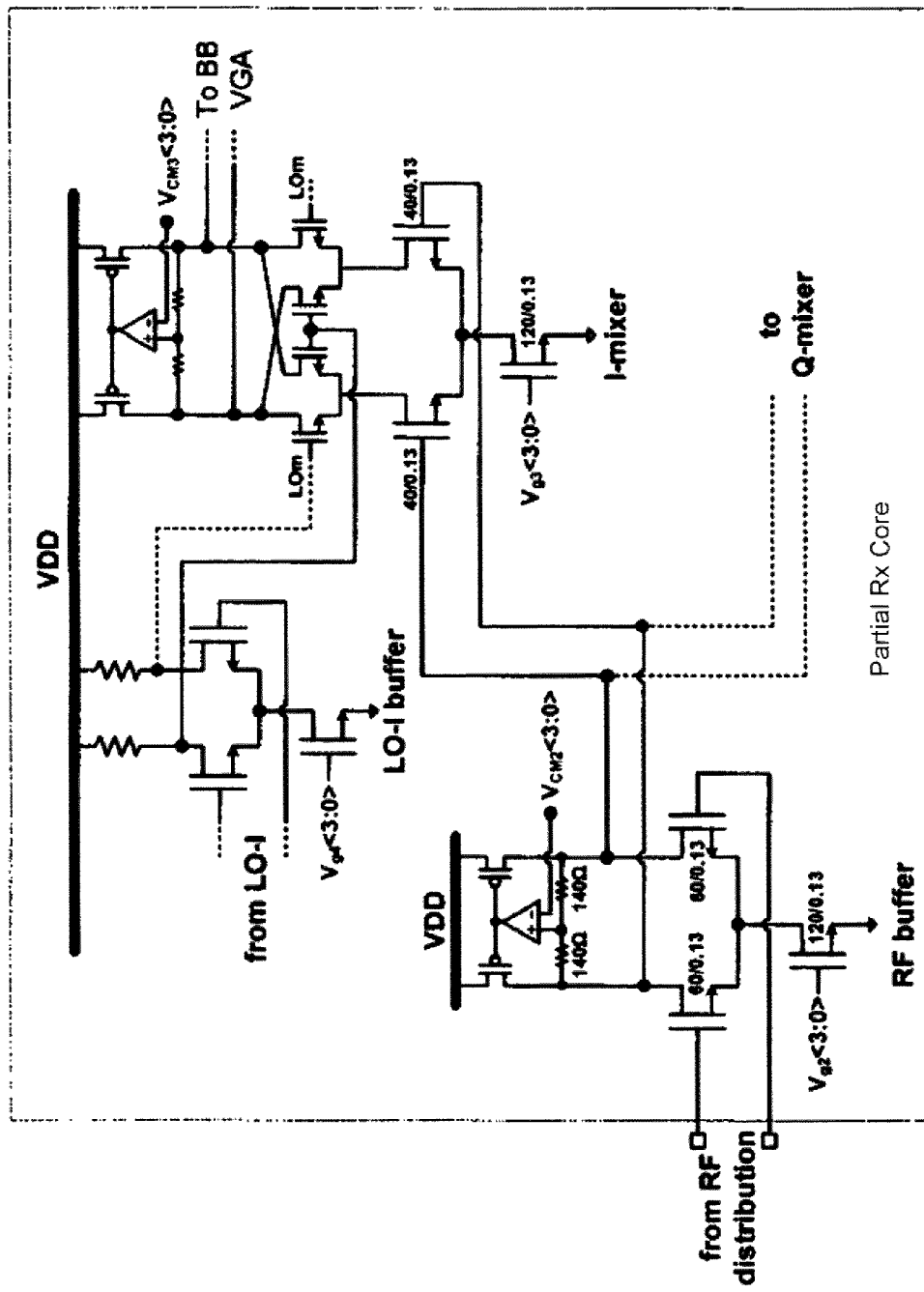
FIG. 3A shows a schematic diagram of one embodiment of a receiver (Rx or RX) core suitable for use in a DSCC RF IC.

In one exemplary embodiment, the total power consumption was further reduced by lowering the main system supply voltage to 1 V. Reduced supply voltage accompanied with process variations randomizes the biasing of both the analog and RF parts. The circuit recovery process typically begins with a bias code scan for each of the blocks, a measure of the circuit deviation and recovery. Extensive use of common-mode feedback with digitally adjustable common voltage and bias current then permits independent control of biasing of the different blocks. Increased power, for running the bias control process, is only used for a given time while performing the process. By performing the bias control process, circuits having variations related to process deviations can be recovered to more optimal bias settings. FIG. 3A shows a schematic diagram of one embodiment of an Rx (receiver) core suitable for use in a DSCC RF IC. The exemplary circuit shown in FIG. 3A is suitable to surround the mixers and provides an illustration of how the bias-code scan process works. The mixer's LO, RF and IF port's DC voltages are scanned by sweeping $V_{g4}$, $V_{cm2}$ and $V_{cm3}$ independently to find the correct bias settings, and to save the correct bias settings for future use. Other bias voltages include gate voltages such as $V_{g2}$ and $V_{g3}$.

Figure 3B:
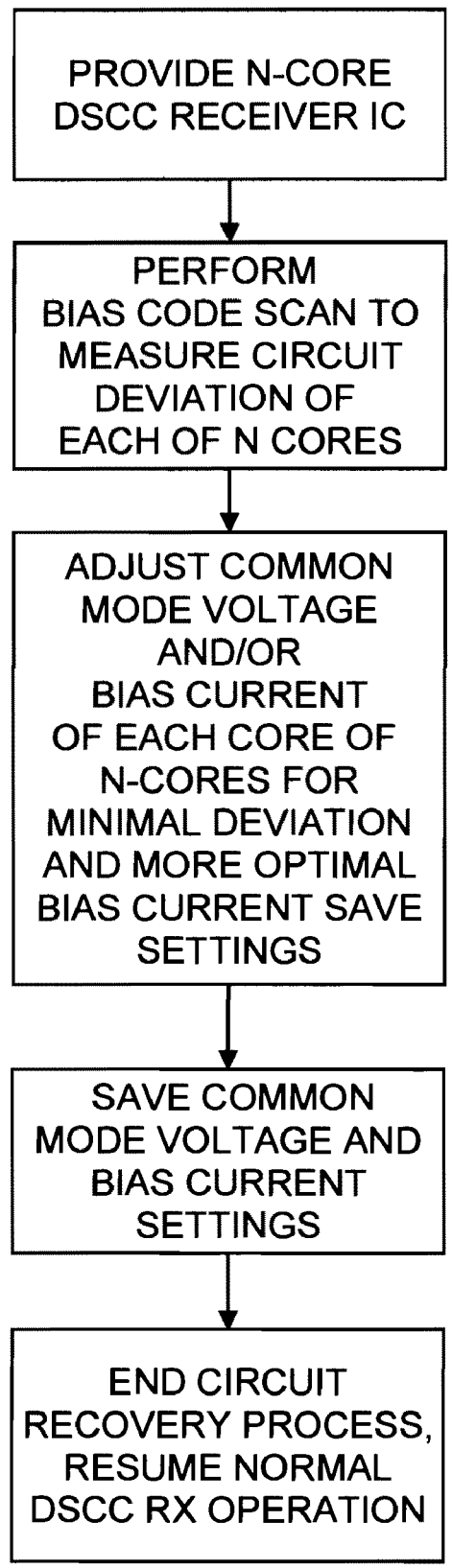
FIG. 3B shows a flow chart of one embodiment of a method to perform a circuit recovery process.

FIG. 3B shows a flow chart of one embodiment of a method suitable to perform the circuit recovery process. An N-core DSCC receiver IC is provided. A bias code scan is performed to measure the circuit deviation of each of the N-cores. Then one or more common mode voltages and/or one or more bias currents are adjusted for each of the N-cores. The one or more newly determined common mode voltages and bias currents are recorded (saved) as DSCC IC settings. The circuit recovery process is then ended and the DSCC IC resumes normal DSCC receiver operation.

Figure 3C:
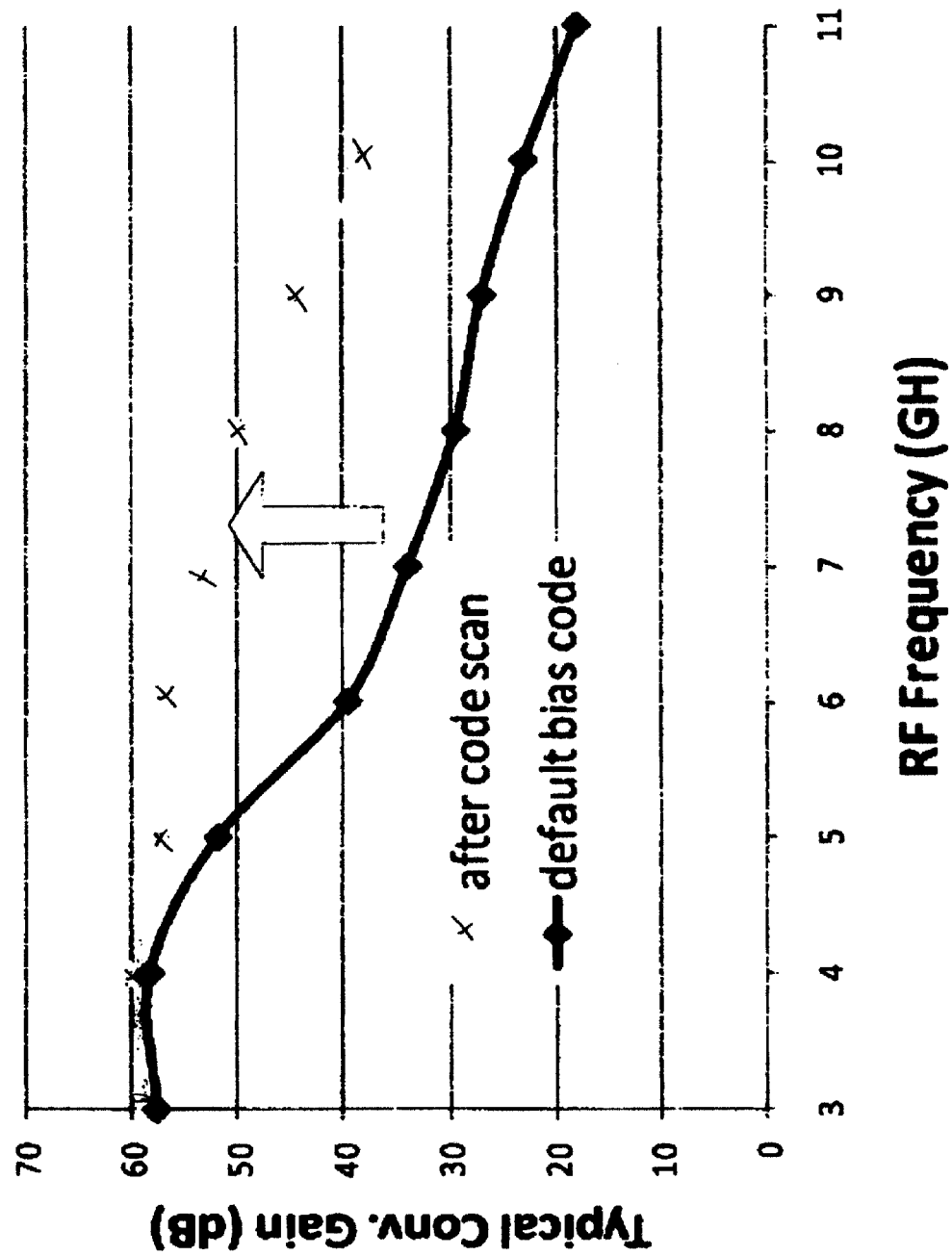
FIG. 3C shows a graph of typical convergence gain plotted against RF frequency (GHz).

FIG. 3C shows a graph of typical convergence gain plotted against RF frequency (GHz) to illustrate a typical case of system convergence gain recovery after the bias code scan process. Under the same VGA settings, convergence gain has been improved by an average 12 dB using the bias voltage code scanning and recovery process. The exemplary octa-core receiver was implemented in a 130 nm CMOS process with seven metal layers.

Figure 4A:
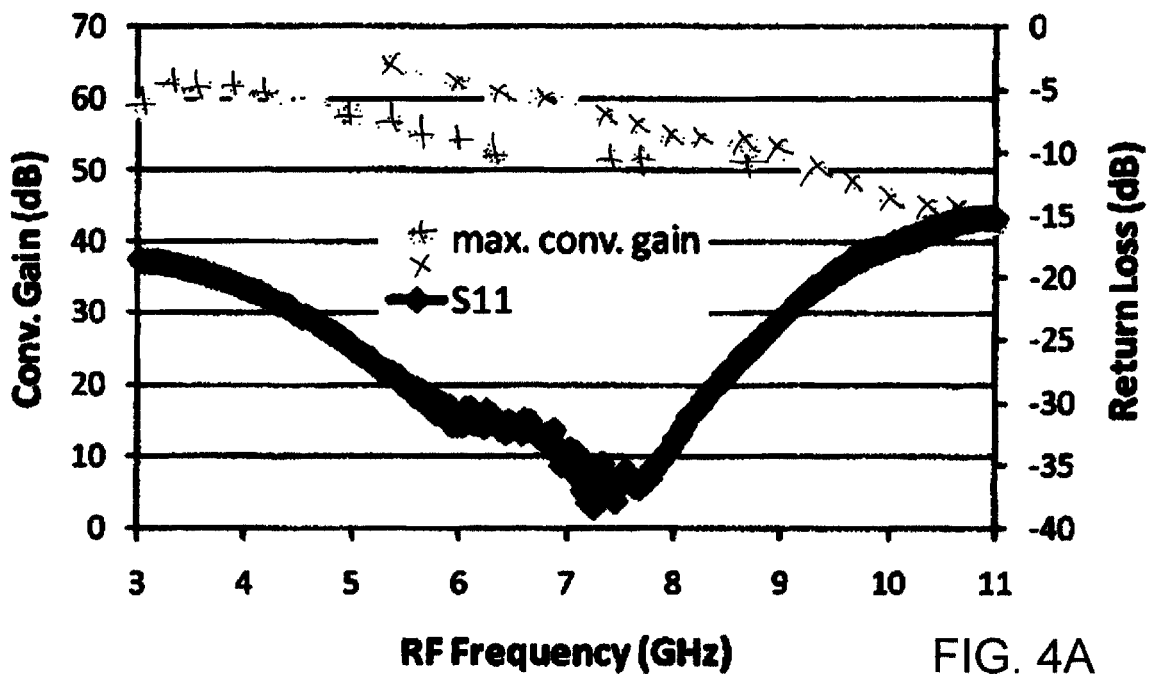
FIG. 4A shows a graph of two curves, maximum conversion gain and return loss plotted as Conversion Gain versus RF frequency.
Figure 4B:
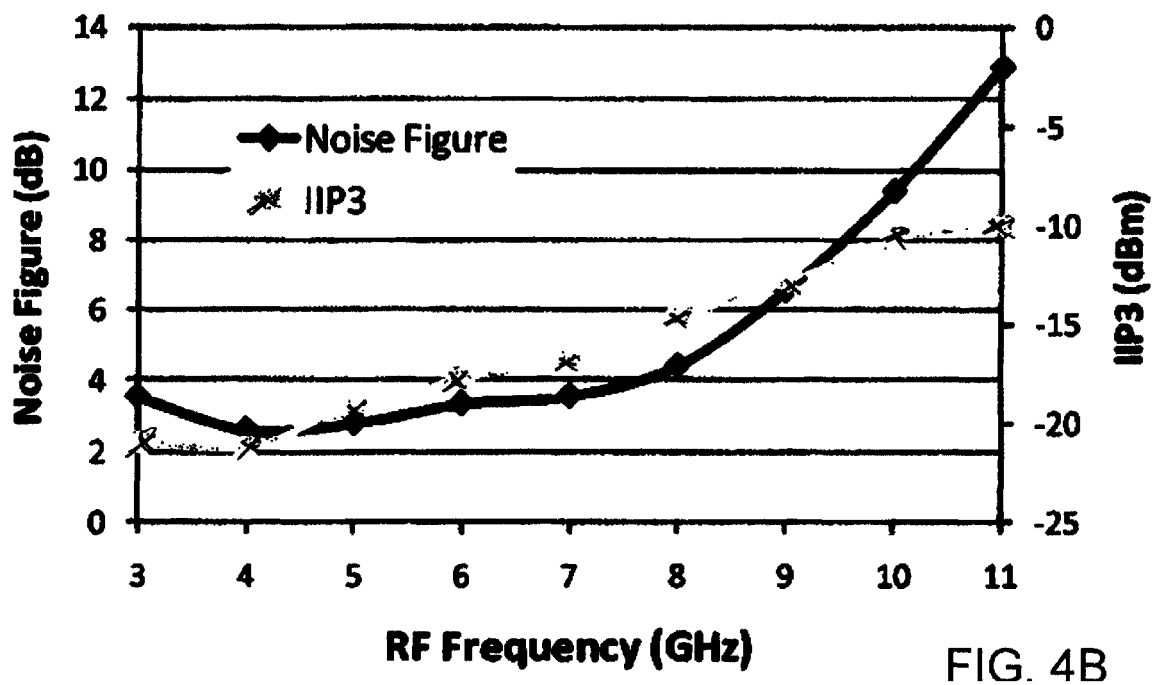
FIG. 4B shows a graph of two curves, noise figure and IIP3 (third order input intercept point) plotted versus RF frequency (GHz).

The graphs of FIG. 4A and FIG. 4B show the measured performance of a prototype DSCC receiver over the 3~11 GHz. FIG. 4A shows a graph of two curves, maximum conversion gain and return loss (S11 parameter) plotted as Conversion Gain (dB) versus RF frequency (GHz). FIG. 4B shows a graph of two curves, noise figure (NF) and IIP3 (third order input intercept point) plotted versus RF frequency (GHz).

Figure 6:
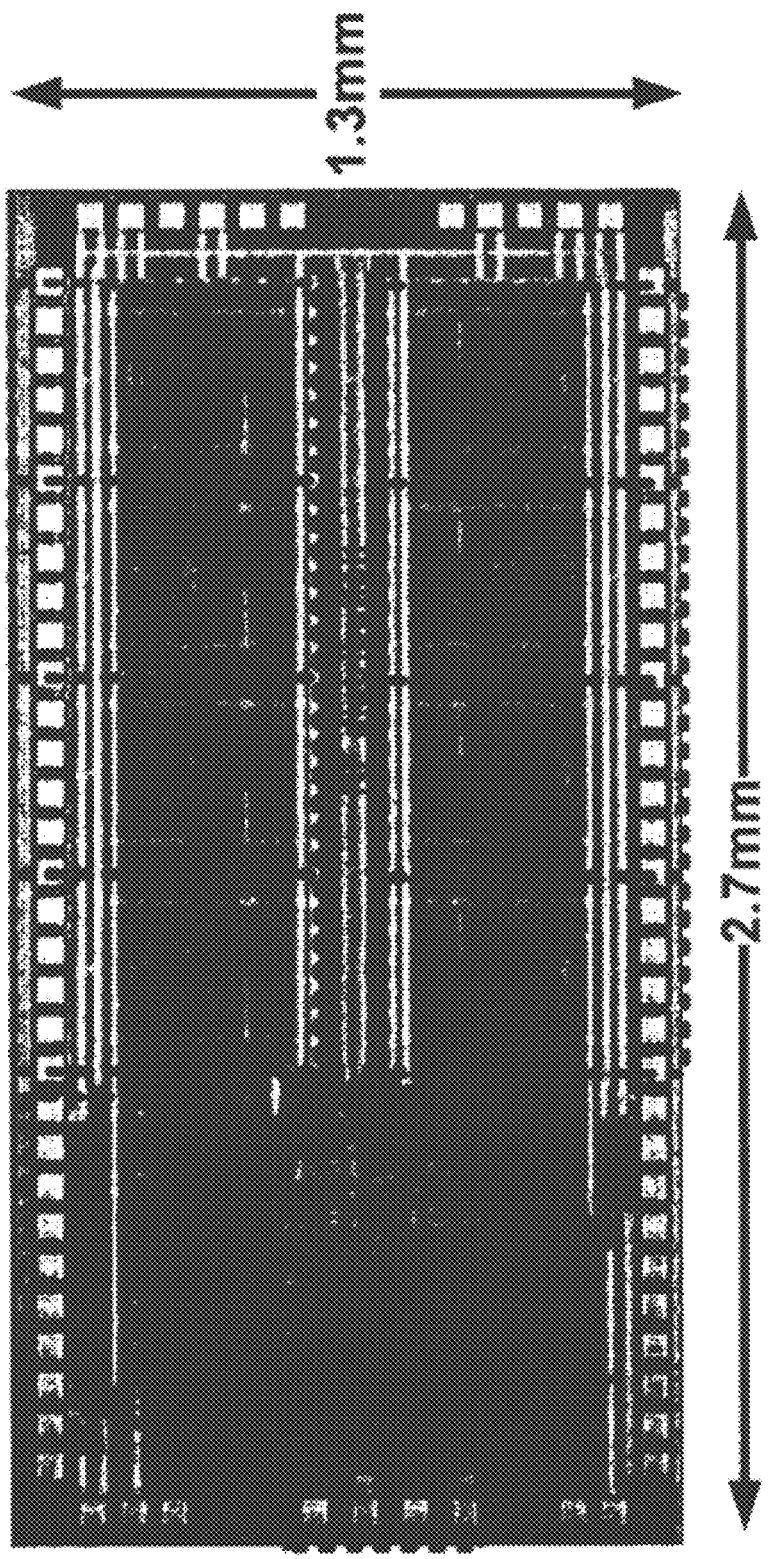
FIG. 6 shows a micrograph of the exemplary octa-core receiver chip.

The complete performance summary of the exemplary octa-core DSCC receiver described herein above is given in the table of FIG. 5. FIG. 6 shows a micrograph of the exemplary octa-core receiver chip which occupies an area of 1.3 mm×2.7 mm.

A receiver based on an integrated DSCC receiver IC, as those embodiments are described hereinabove, can include a microprocessor or other suitable control circuit or system to control the DSCC receiver IC. Some or all of the steps of any related processes, such as a circuit recovery process can be controlled by an on board microprocessor or equivalent circuit or system or can be accomplished by an external microprocessor or equivalent configured to control an integrated DSCC receiver IC. Similarly, active channel selection and the corresponding tuning of N cores can be controlled by an on board microprocessor or equivalent processing unit or can be accomplished by an external microprocessor or equivalent circuit or system configured to control an integrated DSCC receiver IC.

DEFINITIONS

Recording a result or a time such as for example, recording results of a circuit recovery process as DSCC IC settings is understood to mean and is defined herein as writing output data to a storage element, to a machine-readable storage medium, or to a storage device. Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording data, such as settings, for later use (e.g., writing a data to memory or to digital memory) can be performed to enable the use of the recorded information as output, as data for display to a user, or as data to be made available for later use. Such digital memory elements or chips can be standalone memory devices, or can be incorporated within a device of interest. "Writing data" or "writing output data to memory" is defined herein as including writing transformed data to registers within a microcomputer. As such, recording such as "Writing output data" or "writing data to memory" includes streaming data, such as streaming data sent from a transmission circuit.

"Microprocessor" is defined herein as synonymous with microcomputer, microcontroller, and digital signal processor ("DSP"). It is understood that memory used by the microprocessor, including for example a calculation algorithm coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microprocessor functions, either in hardware logic, software emulation of a microprocessor, or by a combination of the two. Apparatus having any of the inventive features described herein can operate entirely on one microprocessor or can include more than one microprocessor.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An integrated multi-core RF device comprising:
   a substrate having a surface;
   a common amplifier disposed on said substrate, said common amplifier electrically coupled to a RF input terminal and outputting an amplified RF signal;
   a common transmission line electrically coupled to said common amplifier and configured to supply said amplified RF signal to a plurality of common transmission line distribution connections; and
   a plurality of receiver cores disposed on said substrate, each receiver core of said plurality of receiver cores having a receiver core RF input electrically coupled to one of said plurality of common transmission line distribution connections, each core configured to be tunable to a channel and to output at least one baseband output per channel;
   said integrated multi-core RF device configured to be controlled to provide a maximum physical distance between receiver cores that are active in real time and that have adjacent LO frequencies, and configured to concurrently receive one or more of a plurality of channels using a set of active receiver cores that is configured to concurrently down convert said each one of said plurality of channels to a corresponding down converted baseband signal, said integrated multi-core RF device configured to allow dynamic selection of said one or more of said plurality of channels over time.

2. The integrated multi-core RF device of claim 1, wherein said common amplifier comprises a weighted distributed low noise amplifier.

3. The integrated multi-core RF device of claim 1, wherein said common transmission line comprises a balanced transmission line.

4. The integrated multi-core RF device of claim 3, wherein said integrated multi-core RF device further comprises a RF balun electrically disposed between said common amplifier and said balanced transmission line.

5. The integrated multi-core RF device of claim 1, wherein each of said receiver cores comprises an I baseband output and a Q baseband output.

6. The integrated multi-core RF device of claim 1, wherein each of said receiver cores comprises a RF input amplifier (IA) having a RF IA output, a first mixer, a second mixer, an I&Q generator configured to provide a LO-I signal electrically coupled to a first input of said first mixer and a LO-Q signal electrically coupled to a first input of said second mixer, a second input terminal of said first mixer and said second mixer both electrically coupled to said RF IA output, said first mixer configured to provide an I baseband output and electrically coupled to an I baseband output terminal and said second mixer configured to provide a Q baseband output and electrically coupled to a Q baseband output terminal.

7. The integrated multi-core RF device of claim 6, wherein said LO-I and said LO-Q signals of each of said receiver cores are configured to have a LO frequency of f×n, where f is a fundamental frequency and where n is an odd integer in the range of 7 to 19 and at least each adjacent receiver core disposed on said substrate has a different said LO-I and said LO-Q signal frequency.

8. The integrated multi-core RF device of claim 7, wherein said LO frequency is given by the equation: $LO_{freq}=528*n$ MHz, where n is an odd integer in the range of 7 to 19.

9. The integrated multi-core RF device of claim 6, wherein each of said receiver cores further comprises a phase locked loop (PLL) electrically coupled to an input of said I&Q generator, said PLL electrically coupled to a frequency reference.

10. The integrated multi-core RF device of claim 9, wherein each PLL of each of said receiver core includes a voltage-controlled oscillator (VCO) having a tuning range and wherein two or more receiver cores are configured to have overlapping tuning ranges.

11. The integrated multi-core RF device of claim 1, wherein a selected number of said plurality of receiver cores are configured to be made active according to a selected one of availability of said receiver core and data rate demand.

12. The integrated multi-core RF device of claim 1, further comprising a guard ring substantially surrounding at least one of said receiver cores.

13. A DSCC RF receiver comprising:
an antenna;
a DSCC IC according to claim 1, said RF input terminal electrically coupled to said antenna and configured to receive an electromagnetic signal;
a demodulator to demodulate said baseband output and to provide a corresponding demodulated output signal at a receiver output terminal;
an electronic circuit configured to control said DSCC IC; and
a power source configured to power said DSCC IC, said demodulator, and said electronic circuit.

14. The DSCC receiver of claim 13, wherein said electronic circuit comprises a microprocessor.

* * * * *